United States Patent [19]

Motoba et al.

[11]  4,242,314

[45]  Dec. 30, 1980

[54] PROCESS FOR SEPARATION AND RECOVERY OF COBALT BY STRIPPING

[76] Inventors: Kazuhiko Motoba, 1-4-7 Miyata-cho; Eiji Itoh, 1-4-15 Miyata-cho, both of Hitachi-shi, Ibaragi-ken, Japan

[21] Appl. No.: 58,771

[22] Filed: Jul. 19, 1979

[30] Foreign Application Priority Data

Nov. 9, 1978 [JP] Japan .................................. 53/138115
Nov. 9, 1978 [JP] Japan .................................. 53/138116

[51] Int. Cl.³ ............................................ C01G 51/00
[52] U.S. Cl. ..................................... 423/139; 423/100; 423/24
[58] Field of Search ................. 423/139, DIG. 14, 24, 423/100

[56] References Cited

U.S. PATENT DOCUMENTS 3,399,055  8/1968  Ritey .................................... 423/139

3,966,569  6/1976  Reinhardt ............................ 423/139
4,196,076  4/80    Fujimoto .............................. 210/21

FOREIGN PATENT DOCUMENTS 2820841  11/1978  Fed. Rep. of Germany .......... 423/139
50-141579 11/1975  Japan .

OTHER PUBLICATIONS

Morrison et al., *Solvent Extraction in Analytical Chemistry* New York, John Wiley and Sons, Inc. pp. 56, 57, 107, 108.

*Primary Examiner*—Brian E. Hearn

[57]  ABSTRACT

Disclosed in the present invention is a process for selectively separating and recovering cobalt by liquid-liquid extraction from an aqueous solution containing cobalt such as those obtained by leaching a cobalt-containing ore with an acid by utilizing an organic solvent containing an alkyl ester of alkylphosphonic acid as the extractant.

4 Claims, 2 Drawing Figures

PROCESS FOR SEPARATION AND RECOVERY OF COBALT BY STRIPPING

BACKGROUND OF THE INVENTION

The present invention relates to a process for separating and recovering cobalt from an aqueous solution containing cobalt and other metals such as nickel, zinc, copper, etc. More particularly, the invention relates to a process for separating and recovering cobalt with high purity by a liquid-liquid solvent extraction method from the above-mentioned aqueous solution containing cobalt and other metals such as nickel, zinc, copper, etc. such as obtained from acid leaching of a cobalt-containing ore.

There have recently been developed the techniques for selectively separating and recovering cobalt by applying a liquid-liquid solvent extraction method from an aqueous solution containing cobalt such as obtained from acid leaching of an ore containing cobalt together with nickel and other metal, and this initiated a variety of proposals on means for separation of cobalt. Nonetheless, there is not yet established any advantageous process capable of separating and recovering cobalt with high purity from the above-mentioned aqueous solution containing cobalt and other metals such as nickel, zinc, copper, etc.

We have previously found the excellent availability of mono-2-ethylhexyl ester of 2-ethylhexylphosphonic acid (hereinafter referred to as M2EHP) as an effective extractant for the selective extraction of cobalt and succeeded in moderately selectively extracting and separating cobalt from an aqueous solution containing cobalt through a liquid-liquid extraction process by using an organic solvent containing the above-mentioned M2EHP. However, it was still impossible to avoid transfer of small amounts of metal ions such as zinc and copper ions present in the aqueous solution into the organic solvent phase together with cobalt, so that when cobalt in the organic solvent phase is separated and recovered by conventional back extraction (back extraction of metal is called hereinafter "stripping" of a metal), these metal ions are also stripped along with cobalt, making it practically impossible to separate and recover cobalt with high purity.

As a result of further studies for overcoming the problems, we found out that a very selective stripping of cobalt is made possible by controlling the pH of the stripping system within a predetermined range during the stripping of cobalt from the cobalt-containing organic phase, and that other metal (ions) remained in the organic phase afer the above-mentioned stripping of cobalt can be effectively stripped by the second step of stripping while controlling the pH of the system below a predetermined level. The present invention has been reached on the basis of these findings.

It was also found that other monoalkyl esters of alkylphosphonic acid can as well be used as an extractant in the process of the present invention.

It is therefore an object of the present invention to provide a process for separating and recovering cobalt with high purity from an aqueous solution containing cobalt and other metals such as nickel, zinc, copper, etc.

It is also another object of the present invention to provide an advantageous process which is not only capable of separating and recovering cobalt with high purity from an aqueous solution containing cobalt and other metals such as nickel, zinc, copper, etc. but also allows reuse of the organic solvent used for the extraction of cobalt after purifying such a solvent.

BRIEF EXPLANATION OF DRAWINGS

In the accompanying drawings.

DETAILED DESCRIPTION OF THE INVENTION

Figure 1:
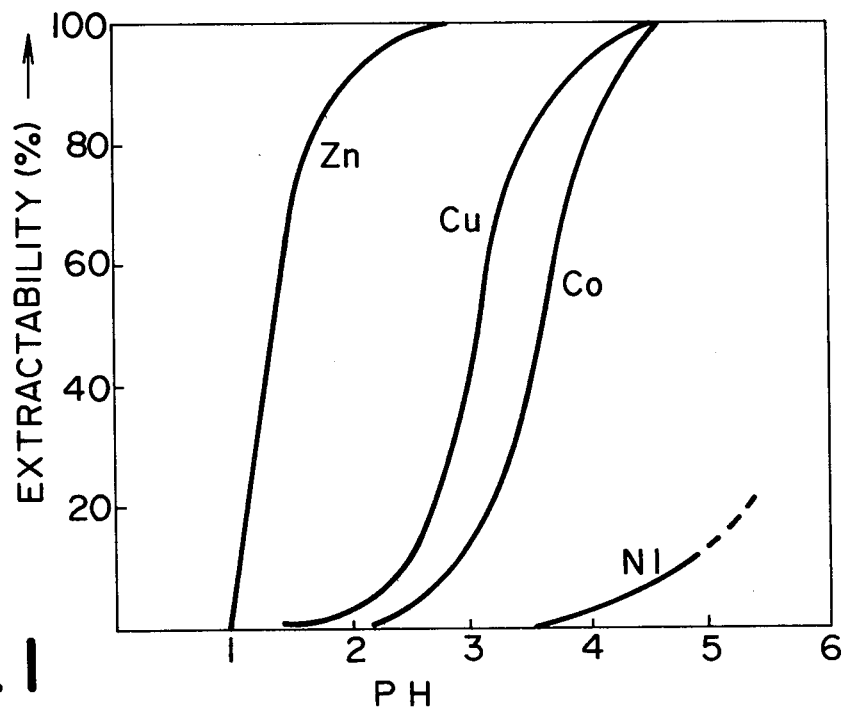
FIG. 1 is a graph illustrating the relationship between the extractability of each metal of cobalt, nickel, zinc and copper in an aqueous solution containing cobalt and other metals such as nickel, zinc and copper and the pH of the system as observed when bringing the solution into contact with an organic solution containing 20% by volume of M2EHP.

The invention is now described in detail.

The monoalkyl esters of alkylphosphonic acid usable as a cobalt-extractant in the process of the present invention are those represented by the following formula (I):

wherein $R_1$ and $R_2$ may be the same or different and represent an alkyl group having 8 to 10 carbon atoms. These esters include, in addition to the above-mentioned M2EHP, mono-3,5,5-trimethylhexyl ester or mono-isodecyl ester of 3,5,5-trimethylhexylphosphonic acid, mono-isodecyl ester of isodecylphosphonic acid, mono-3,5,5-trimethylhexylester or mono-isodecyl ester of 2-ethylhexylphosphonic acid and the like.

In practicing the process of the present invention, there is at first prepared an organic solvent by dissolving the extractant in an inert organic diluent such as kerosene to a concentration of usually 2.5 to 40% by volume, and this solvent is brought into contact with the aqueous solution containing cobalt and other metals to moderately selectively extract cobalt into the organic solvent from the aqueous solution in which cobalt was present. Such step of extraction can be well accomplished by employing an ordinary liquid-liquid solvent extraction technique.

Then, the organic solvent phase into which cobalt has been extracted as mentioned above (such an organic solvent phase being hereinafter referred to as an organic phase) containing small amount of metallic impurities is brought into contact with an aqueous solution containing a mineral acid such as hydrochloric acid or sulfuric acid to effect the stripping of cobalt from the organic phase. In this step, it is very important to control the pH of the system within the range of 1.5 to 3.5 during the stripping operation for allowing selective stripping of cobalt alone substantially.

In the process of the present invention, the total system of stripping cobalt from the organic phase containing cobalt and other metallic impurities may be performed in plural stages by carrying out the first stage in which only cobalt is stripped from the organic phase while controlling the pH within the range of 1.5 to 3.5 and carrying out the second stage in which the organic phase from the first stage is brought into contact with a circulating mineral acid solution while properly feeding a mineral acid to keep the pH at lower than 1.0 to strip other metallic impurities from the organic phase. A part of the circulating mineral acid solution in which the concentration of other metallic impurities stripped from the organic phase has been raised may be fed to the first stage for repeated use therein while withdrawing other part to the step for removing the impurities outside of the system. The above-mentioned cobalt-stripping operation of the first stage can be accomplished very efficiently when an acid solution released from the step of electrolysis of cobalt is used as the aqueous solution which is brought into contact with the organic phase.

Heretofore, in the stripping of cobalt from the organic phase by using a mineral acid solution, it was impossible to inhibit the transfer of metallic impurities such as zinc, copper, etc., present in the organic phase to the mineral acid solution together with cobalt. However, according to the present invention, such metallic impurities can substantially be retained in the organic phase owing to the fact that the pH at the extraction equilibrium of such metallic impurities is lower than that of cobalt. The stripping of cobalt has been generally practiced according to a multi stage counter current contact system, however according to the system, it is necessary to bring a mineral acid into contact with the organic phase so that the amount of the mineral acid is equivalent to the amount of cobalt ion in the organic phase. Moreover, such a quantitative control is actually very difficult and no effective stripping of cobalt could be attained by this system.

When the amount of mineral acid becomes excessive, the pH of the solution is reduced, resulting in the transfer of metallic impurities to the mineral acid solution together with cobalt, while when the amount of mineral acid becomes insufficient, the residual amount of cobalt in the organic phase increases, resulting in the reduction of recovery of cobalt.

According to the process of the present invention, the stripping of cobalt from the organic phase may be carried out over a wide range of temperature of 15° to 80° C. while keeping the pH within the above-mentioned range, however, in view of the effect of stripping of cobalt and of the safety of operation, a temperature around 60° C. is preferable. The volume ratio of the organic phase to the aqueous phase (O/A) in the stripping of cobalt and the concentration of the acid in the aqueous phase are not subject to any critical definition.

Now referring to FIG. 1, the figure shows a relationship between the extractability of metals and the pH of the aqueous mineral acid solution in the case where the organic phase is a kerosene solution containing 20% by volume of M2EHP at a temperature of 60° C. It will be seen in FIG. 1 that the extractability of cobalt is sharply reduced at the pH of around 2, and so when the stripping is carried out at the pH of 1.5 to 3.5 cobalt can be selectively stripped without accompanying zinc. The extractability of copper is also reduced in the same range of pH, however, since the content of copper is usually very minute and nearly in trace, the above-mentioned range of pH for stripping cobalt is for the check of the stripping of zinc in the actual operation.

The above-mentioned stripping process is described below more concretely with reference to FIG. 2.

Figure 2:
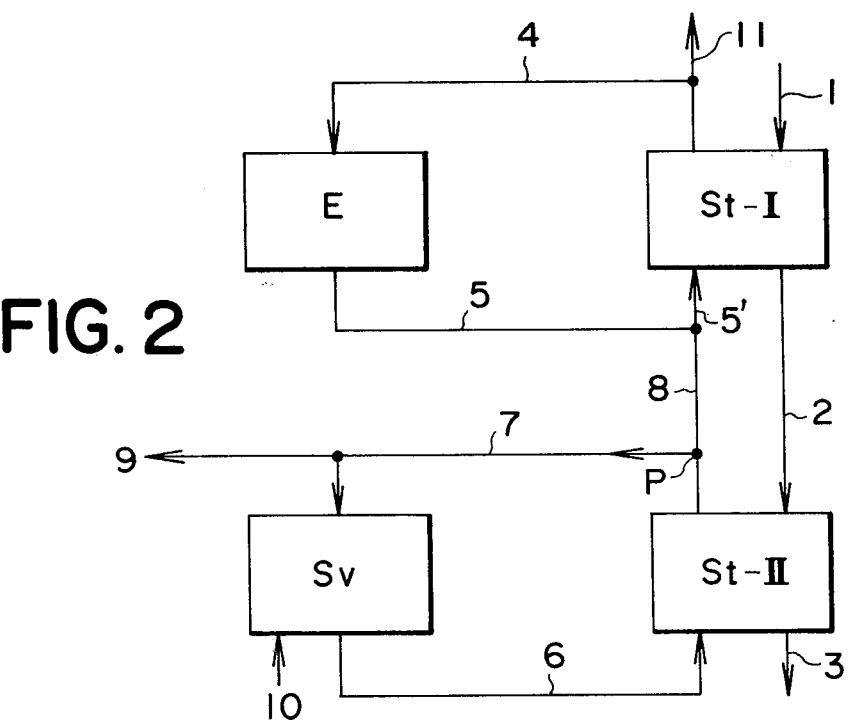
FIG. 2 is a flow chart illustrating the operating procedures in carrying out the process of the present invention.

In FIG. 2, the following notation is adopted:

St-I and St-II are respectively the first and the second stages of stripping step; E is the electrolysis step of cobalt; Sv is an aqueous mineral acid solution tank; 1 is a feed line of the organic phase into the first stage of stripping; 2 is a feed line of the organic phase into the second stage of stripping; 3 is a discharge line of the organic phase deprived of cobalt and metallic impurities; 4 is a feed line to the electrolysis step E of the aqueous solution containing stripped cobalt with a small amount of other metalic impurities; 5 is a feed line of the aqueous mineral acid solution from the electrolysis step E to the first stage of stripping St-I; 5′ is a line in which the solution from 5 and a part of circulating aqueous mineral acid solution from the second stage of stripping flow together into the first stage of stripping; 6 is a feed line of an aqueous mineral acid solution from its tank Sv to the second stage of stripping St-II; the aqueous mineral acid solution being circulated through lines 6 and 7; the aqueous effluent from the second stage of stripping being partly sent to the first stage of stripping via a line 8 under control of a valve P; 9 is a line through which a part of the circulating aqueous mineral acid solution containing accumulated metals such as zinc, copper and other metals is withdrawn from the system to outside; 10 is a supply line of the mineral acid into the system; 11 is a line for a part of the aqueous mineral acid solution for washing the organic phase before entering into the first stage of stripping St-I.

In the actual operation of the system, the organic phase which has moderately selectively extracted cobalt from the aqueous solution containing cobalt and metallic impurities in a separate system is fed into the first stage St-I of stripping cobalt from line 1 while an aqueous mineral acid solution from the electrolysis step E is simultaneously fed into St-I via line 5 so that the organic phase is brought into contact with the aqueous mineral acid solution in St-I. In order to control the pH at 1.5 to 3.5 during the above-mentioned contact, a part of the circulating aqueous mineral acid solution is supplied via line 8 under the control of the valve P.

Upon the above-mentioned contact, cobalt contained in the organic phase is quite selectively stripped by the aqueous mineral acid solution and the solution is supplied into the electrolysis step E via line 4. The metallic impurities contained in the aqueous mineral acid solution from the electrolysis step E are extracted in the organic phase introduced into the first stage of stripping of cobalt. In another words, the first stage of stripping of cobalt has an effect of washing the aqueous mineral acid solution sent from line 5, allowing the obtainment of cobalt metal of high purity in the electrolysis step. The organic phase from the first stage of stripping step St-I is sent to the second stage of stripping step St-II, the flow of the organic phase being synchronized with the flow of introduction of another aqueous mineral acid solution from the tank Sv via line 6. The pH of the aqueous solution is controlled to be lower than 1.0 by the supply of a mineral acid into the tank Sv via line 10 so that the organic phase is brought into contact with the aqueous mineral acid solution at a pH lower than 1.0 in the second stage of stripping. The effluent organic phase from the second stage is now free from metallic impurities and also from cobalt which has been included in a minute amount in the effluent from St-I. Accordingly, the organic phase from St-II can be recycled to the cobalt extraction step as the extractant.

In the above-mentioned operation, the metallic impurities such as zinc, copper, etc. and minute amount of the cobalt which have been contained in the effluent organic phase from St-I are stripped by the aqueous mineral acid solution with in St-II, and so they accumulate gradually in the circulating mineral acid solution in the repeated stripping of the organic phase. For that reason, a part of the circulating solution is drawn out from the circulating system via line 9 to the tank of aqueous solution containing cobalt (outside the whole system of stripping) after having been treated for removing other impurities. The aqueous solution containing cobalt is sent to the cobalt extraction step.

The pH control for the first and second stages of stripping in the present invention is accomplished as follows:

In the first stage, it is advised to control the pH by adjusting the amount of the mineral acid solution drawn out from the circulating system, that is, the amount of the solution recycled to the first stage of stripping, while checking the pH of the solution effluent from the stage of stripping cobalt. In the second stage, the pH is controlled by adjusting the amount of mineral acid supplied into the circulating system while checking the pH of the aqueous solution effluent from the stage of stripping metallic impurities. In the above-mentioned process, the metallic impurities such as zinc, copper, etc., are not stripped in the first stage of stripping but retained in the organic phase effluent from the first stage of stripping, however they are stripped in the second stage and transferred into the aqueous mineral acid solution. Thus, the aqueous solution is circulated, as mentioned above, and a part thereof is supplied to the first stage, while the metallic impurities contained in the part of the aqueous mineral acid solution supplied to the first stage is not stripped in the first stage but extracted by the organic phase. As a result, the metallic impurities are gradually concentrated in the aqueous mineral acid solution in circulation.

The critical significance of pH control in each stage of stripping as well as the effect of stripping at pH of below 1.0 for stripping the metallic impurities in the organic phase effluent from the first stage of stripping of cobalt will be appreciated from FIG. 1. Extractability of copper also is reduced in the pH range used for the stripping of cobalt, however, since the copper content in the organic phase introduced into the second stage of stripping is usually minute, the range of pH which is capable of checking the stripping of zinc can be effectively employed for the actual operation.

Liquid-liquid contact in the first and second stages of stripping can be carried out over a wide temperature range from 15° to 80° C. as mentioned before, however, usually a temperature around 60° C. is preferable.

Although no critical limits are imposed on the volume ratio of organic phase to aqueous mineral acid solution (O/A) in each stage of stripping and on the concentration of mineral acid in the aqueous solution, it is preferable to adopt them after selection taking into consideration of the concentration of cobalt in the organic phase as well as the concentrations of the metallic impurities such as zinc, copper, etc., in the organic phase.

As has been described above, the process of the present invention is not only capable of recovering (stripping) cobalt with high purity from an aqueous solution containing cobalt but also has an advantage to allow re-utilization of the organic solvent once used for the extraction of cobalt. Moreover, the process of the present invention is highly advantageous for operation on a commercial scale because the stripping of cobalt from the organic phase and the stripping of metallic impurities to clear the organic solvent can be accomplished on a circulating system. Further, the accumulation of metallic impurities in the aqueous mineral acid solution in circulation can be controlled by drawing out a part of the aqueous mineral acid solution from the circulating system.

Moreover, according to the present invention, it is possible to feed a highly pure cobalt solution containing only a very small amount of metallic impurities into the electrolysis step, so that it is possible to collect metallic cobalt of high quality, and in addition, the organic solvent once used for the extraction of cobalt can be efficiently purified in the process and is made usable again in the extraction step.

The process of the present invention is now described in detail by way of the following non-limiting examples.

EXAMPLE 1

The following test was carried out on the three different organic extractants: M2EHP, mono-isodecyl ester of 2-ethylhexylphosphonic acid and mono-isodecyl ester of 3,5,5-trimethylphosphonic acid.

An aqueous solution containing cobalt and small amounts of zinc and copper was brought into contact with the respective three kerosene solutions, each containing either of the above-mentioned extractants in an amount of 20% by volume, at 60° C. to prepare three organic phases each containing 15 g/l of cobalt, 4 mg/l of zinc and 1 mg/l of copper. Each organic phase was further brought into contact with an acid solution at pH of 0.2 containing 35 g/l of sulfuric acid at a volume ratio of O/A of approximately 2 at 60° C. to carry out the stripping of cobalt. The pH of the effluent aqueous sulfuric acid solution was 2.5 to 3.0. The contents of cobalt, zinc and copper in the effluent aqueous sulfuric acid solution and the effluent organic phase from the step of stripping are shown in Table 1. In Table 1, aqueous phase 'A' means the effluent aqueous sulfuric acid solution and organic phase 'O' means one of the kerosene solutions respectively containing one of the three extractants above-mentioned.

TABLE 1

| Extractant | Stripping of Cobalt | | | | | |
| --- | --- | --- | --- | --- | --- | --- |
|  | 1* | | 2** | | 3*** | |
| Phase | A | O | A | O | A | O |
| Cobalt (g/l) | 21 | 4 | 20.5 | 4.2 | 21.5 | 4.1 |
| Zinc (g/l) | <0.001 | 0.004 | <0.001 | 0.0038 | <0.001 | 0.0039 |
| Copper (g/l) | <0.001 | 0.001 | <0.001 | 0.001 | <0.001 | 0.001 |

Note:
1*: M2EHP;
2**: monoisodecyl ester of 2-ethylhexylphosphonic acid; and
3***: mono-isodecyl ester of 3,5,5-trimethylhexylphosphonic acid.

Then, the effluent organic phases were respectively subjected to stripping by bringing into contact with an aqueous sulfuric acid solution containing 50 g/l of sulfuric acid at a O/A ratio of 1 such that the pH of the aqueous solution effluent from the contact would be remained below 0.5. In each case, the contents of zinc, copper and cobalt in the organic phase were below 1 mg/l. Accordingly, the effluent organic phase could be used again for extraction of cobalt from the aqueous solution containing cobalt.

EXAMPLE 2

The three kinds of kerosene solutions prepared in Example 1 were respectively utilized in the operation of stripping according to FIG. 2 for 3 to 7 days continuously at the O/A of 1/1 and a temperature of 60° C. The mean concentrations of copper and zinc in each solution designated in FIG. 2 (aqueous solutions and organic phase) are shown in Table 2. The pH was controlled at 2.0 to 2.2 in the first stage of stripping, and at 0 to 0.2 in the second stage of stripping.

The conditions of operation were as follows:

Flow rate: 350 liter/min. of organic phase at points 1, 2 and 3.

350 liter/min. of aqueous solution at points 4,5,6 and 7.

10 liter/min. at point 10.

5 liter/min. at points 8, 9 and 11 in FIG. 2.

TABLE 2

| Points in FIG. 2 | Stripping of Copper and Zinc Concentration at points (mg/l) | Organic phase (extractant) | | |
|---|---|---|---|---|
| | | 1* | 2** | 3*** |
| 1 | Copper | <0.5 | <0.5 | <0.5 |
| | Zinc | 0.6 | 0.7 | 0.7 |
| 2 | Copper | <0.5 | <0.5 | <0.5 |
| | Zinc | 1.3 | 1.4 | 1.4 |
| 3 | Copper | trace | trace | trace |
| | Zinc | trace | trace | trace |
| 4 | Copper | 0.5 | 0.6 | 0.5 |
| | Zinc | <0.5 | 0.6 | 0.5 |
| 5 | Copper | 0.6 | 0.5 | 0.6 |
| | Zinc | 0.5 | 0.5 | 0.5 |
| 5' | Copper | 0.7 | 0.6 | 0.7 |
| | Zinc | 1.1 | 1.2 | 1.2 |
| 8 and 9 | Copper | 10 | 11 | 13 |
| | Zinc | 45 | 50 | 50 |

Note:
1*, 2 and 3* mean the same as in Table 1.

As is seen in Table 2, especially the organic phase effluent from the second stage of stripping contains trace of copper and zinc. Accordingly, the object of the present invention is fulfilled.

What is claimed is:

1. In a process for separating and recovering cobalt from an aqueous solution containing cobalt by bringing said aqueous solution into contact with an organic solvent containing a monoalkyl ester of alkylphosphonic acid represented by the formula:

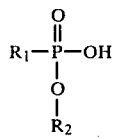

wherein $R_1$ and $R_2$ may be the same or different from each other and represent an alkyl group having 8 to 10 carbon atoms to extract and separate cobalt in said aqueous solution into said organic solvent and then further bringing the resultant organic solvent containing cobalt into contact with an aqueous mineral acid solution to effect the stripping of cobalt, the improvement comprising controlling the pH of said aqueous mineral acid solution in the range of from 1.5 to 3.5 during the contact of said organic solvent with said aqueous mineral acid solution.

2. In a process for separating and recovering cobalt from an aqueous solution containing cobalt by bringing said aqueous solution into contact with an organic solvent containing a monoalkyl ester of alkylphosphonic acid represented by the formula:

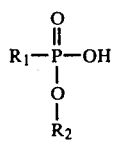

wherein $R_1$ and $R_2$ may be the same or different from each other and present an alkyl group having 8 to 10 carbon atoms to extract and separate cobalt in said aqueous solution into said organic solvent and then further bringing the resultant organic solvent containing cobalt into contact with an aqueous mineral acid solution to effect the stripping of cobalt, the improvement comprising controlling the pH of said aqueous mineral acid solution in the range of from 1.5 to 3.5 during the contact of said organic solvent with said aqueous mineral acid solution, and further bringing the resultant organic solvent after stripping of cobalt into contact with an aqueous mineral acid solution at pH of below 1.0 to effect the stripping of copper and zinc present therein.

3. A process according to claim 2, wherein said aqueous mineral acid solution is held in circulation while controlling its pH at less than 1.0 by supplying the mineral acid and recycling at least a part of the aqueous mineral acid solution in circulation to the stage of stripping of cobalt.

4. A process according to claim 1, wherein said aqueous mineral acid solution is an acid solution obtained from a cobalt electrolysis step.

* * * * *